Figure 4:
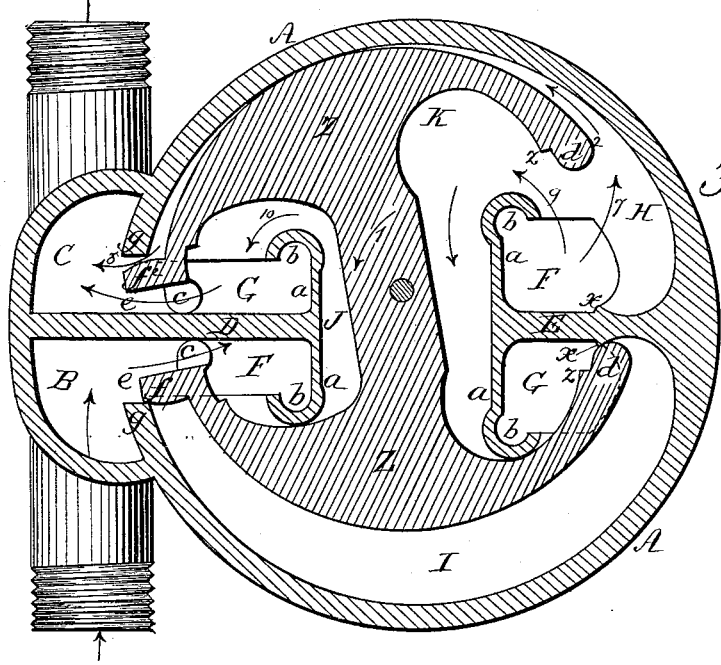
Figure 3:
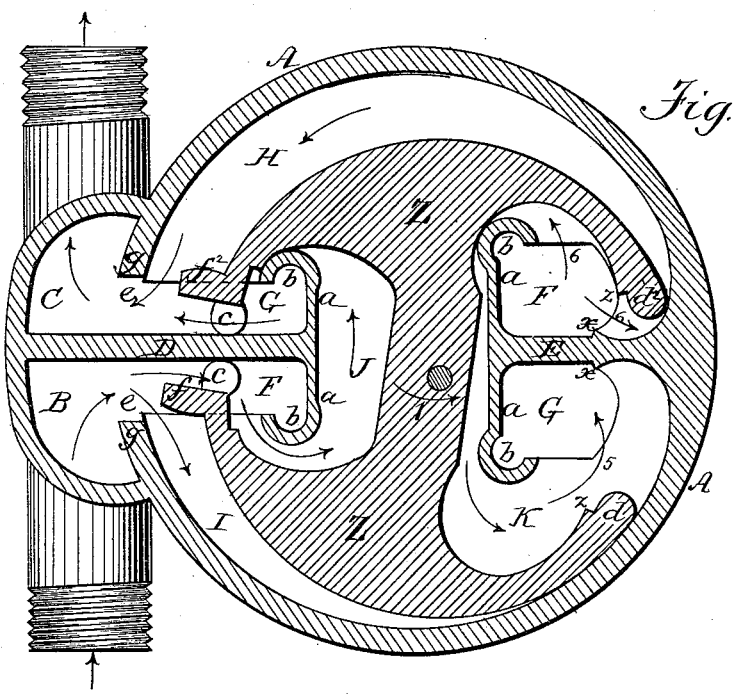

(No Model.) 4 Sheets—Sheet 1.
L. H. NASH.
OSCILLATING WATER METER.
No. 336,141. Patented Feb. 16, 1886.
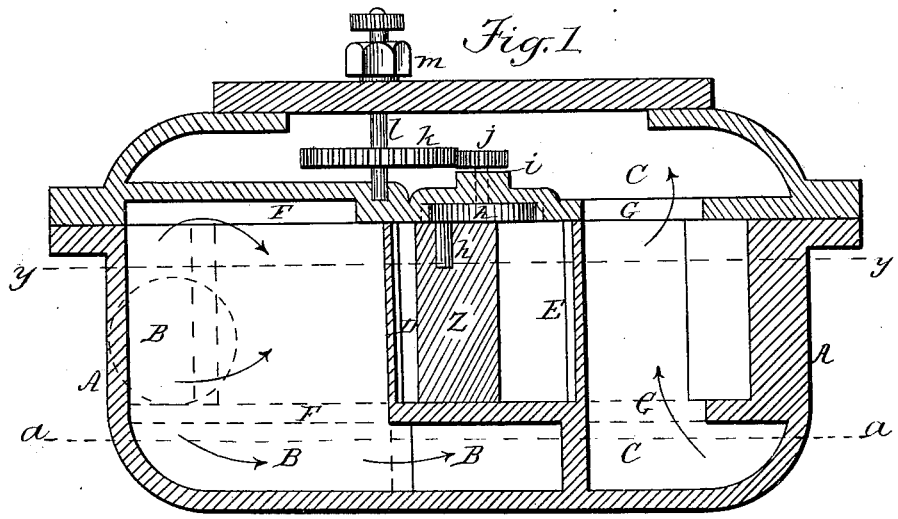
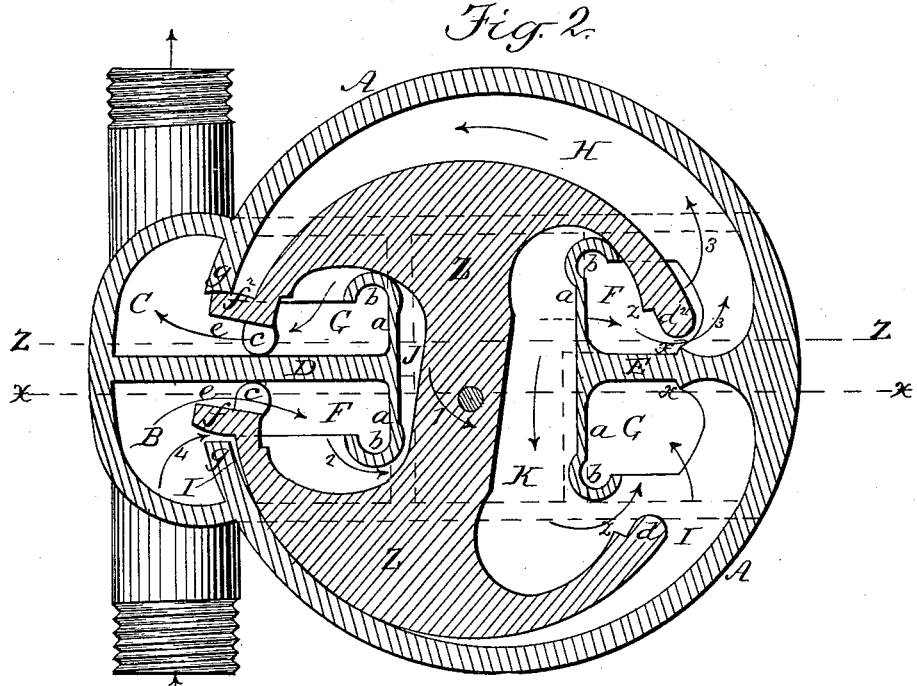
WITNESSES
Bessie P. Johnson
R. E. Grant
INVENTOR
Lewis Hallock Nash
by Johnson and Johnson
Attorney
N. PETERS, Photo-Lithographer, Washington, D. C.

(No Model.) 4 Sheets—Sheet 2.
L. H. NASH.
OSCILLATING WATER METER.

No. 336,141. Patented Feb. 16, 1886.

WITNESSES
Bessie P. Johnson.
R. E. Pratt

INVENTOR
Lewis Hallock Nash
by Johnson and Johnson
Attorneys (No Model.) 4 Sheets—Sheet 3.

L. H. NASH.
OSCILLATING WATER METER.

No. 336,141. Patented Feb. 16, 1886.

WITNESSES
Bessie P. Johnson.
R. E. Grant

INVENTOR
Lewis Hallock Nash
by Johnson and Johnson
Attorneys.

(No Model.) 4 Sheets—Sheet 4.
L. H. NASH.
OSCILLATING WATER METER.
No. 336,141. Patented Feb. 16, 1886.
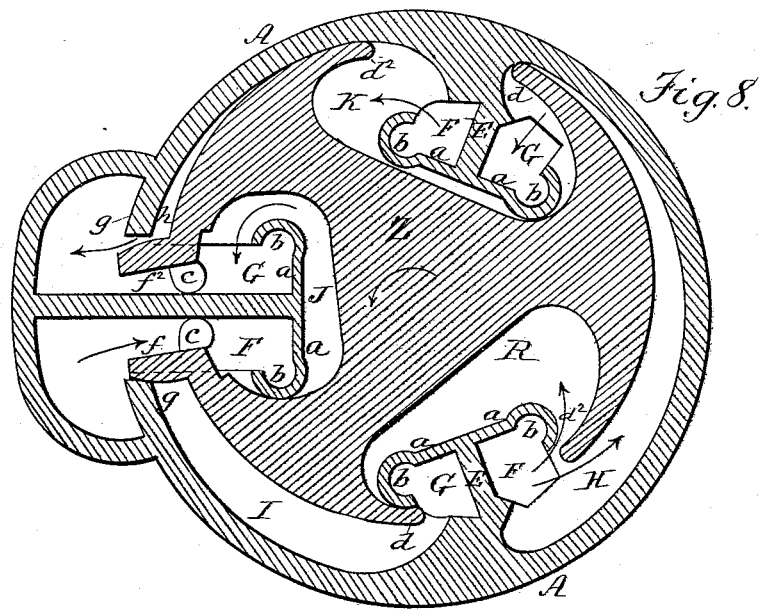
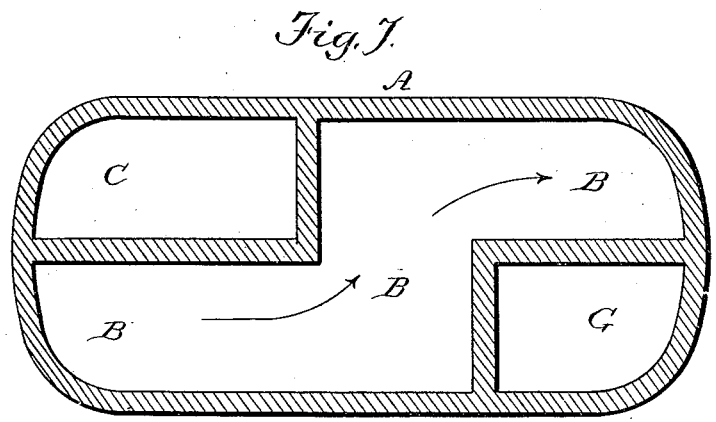
WITNESSES
Bessie P. Johnson.
R. E. Grant
INVENTOR
Lewis Hallock Nash
by Johnson and Johnson
Attorneys.

UNITED STATES PATENT OFFICE.

LEWIS HALLOCK NASH, OF BROOKLYN, ASSIGNOR TO THE NATIONAL METER COMPANY, OF NEW YORK, N. Y.

OSCILLATING WATER-METER.

SPECIFICATION forming part of Letters Patent No. 336,141, dated February 16, 1886.

Application filed September 22, 1885. Serial No. 177,848. (No model.)

*To all whom it may concern:*

Be it known that I, LEWIS HALLOCK NASH, a citizen of the United States, residing at Brooklyn, in the county of Kings and State of New York, have invented new and useful Improvements in Oscillating Water-Meters; of which the following is a specification.

My invention is directed to improvements upon patents granted to me June 23, 1885, numbered 320,578 and 320,579, known in the trade as the "Empire Water-Meter," in which an oscillating piston having cylindrically-curved faces operates within a measuring-chamber to divide the inflow from the outflow, and in which the casing is provided with supply and discharge ports, and having two similar cylindrically-curved interior surfaces, and a piston having two similar curved surfaces capable of moving in tangential contact in a plane at right angles to the axis of the cylinders with the curved surfaces of the casing for forming alternately enlarged and contracted chambers for receiving and discharging water in uniformly-measured quantities. In this construction the arrangement of the ports and of the coacting dividing-surfaces is such as to maintain a uniform inflow and outflow into and from the alternately enlarged and contracting chambers for receiving and discharging the water without leaving any dead-spaces in the said case within which the water tends to lock and prevent the free movement of the piston.

I have also described and shown in my patent of June 17, 1884, numbered 300,627, for oscillating water-meter, a construction and operation in which a case is divided in its interior by the operation of the piston into measuring-chambers by lateral interior wall-projections adapted to stop the passage connecting the two measuring-chambers, and also to divide the interior of the piston into measuring-chambers.

My present improvement is particularly directed to the meter described and shown in my said patent of June 17, 1884; and it consists in provision for increasing the delivery capacity of the meter, and equalizing the action of the flow upon the piston, whereby to reduce the retarding effect upon the piston of the induced currents caused by the rapid movement of the piston. For this purpose I use an oscillating piston having measuring-chambers formed within its interior, open at its circumference at two or more points, adapted to receive case projections of such form as to divide the said chambers into receiving and discharging spaces, each such space being provided with inlet and outlet ports whereby to insure a free and ample supply and corresponding discharge to the measuring-chambers, and thereby prevent the possible formation of dead-spaces within which the confined water would retard or form a lock to the proper movement of the piston, without which a water-meter must be practically useless. I have found in the practical operation of water-meters constructed upon this plan and principal of operation that any construction of meter having its case divided into measuring-chambers by an oscillating piston will be of no practical value as a measuring device unless there is ample provision for the water to flow into and out of the said measuring-chambers with a quiet and easy flow of the water. Therefore, to render such measuring device of practical value, I not only provide ports of the greatest possible capacity, but also so arrange them and form the piston so that the communication of the inlet and of the outlet passages with any measuring-chamber is reversed at the instant when the piston has such a motion that the space in the said measuring-chamber is neither increasing nor diminishing, and the piston is so formed that at this instant it closes communication with one passage and opens communication with the other. In order to still further prevent unequal pressure in adjacent measuring-chambers, the piston is so formed as to allow of free communication between alternate adjacent spaces when they are in the same condition of action—that is, filling or discharging. This is the vital matter in the operation of a meter having two or more coacting receiving and discharging spaces, because, in the rapid movement of the piston, if any one measuring-chamber is enlarging faster than any other measuring-chamber, and the passage supplying this faster-enlarging chamber is too small, the water will not be able to fill this chamber promptly, and there will be a retarding action upon the movement of the piston, due to such causes within the said chamber. On the other hand, if any rapidly-closing chamber-space too rapidly closes its port, then there will be a crowding action in said confined water, producing a retarding effect. Under such disadvantageous conditions it is impossible that a meter give the same registration under different rates of flow, which is the condition demanded of a meter.

My invention is particularly directed to avoid this very matter, which will render such a water-meter useless, and to render such a water-meter perfect in its operation in these particulars, as I will now proceed to describe in connection with the accompanying drawings, in which—

Figure 6:
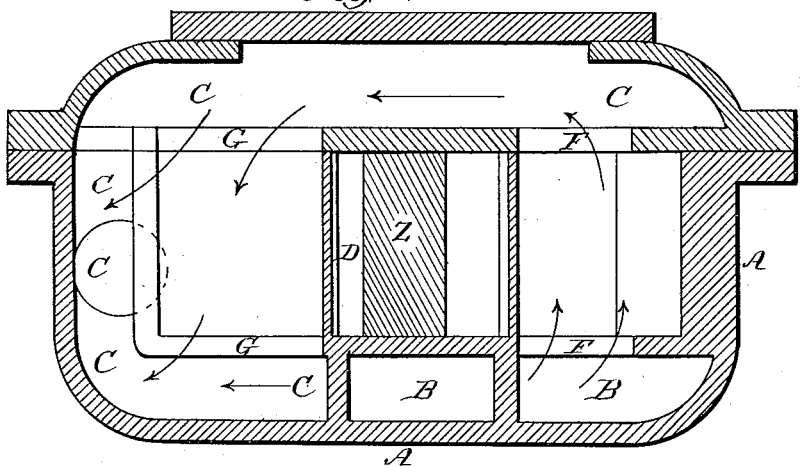
Figure 5:
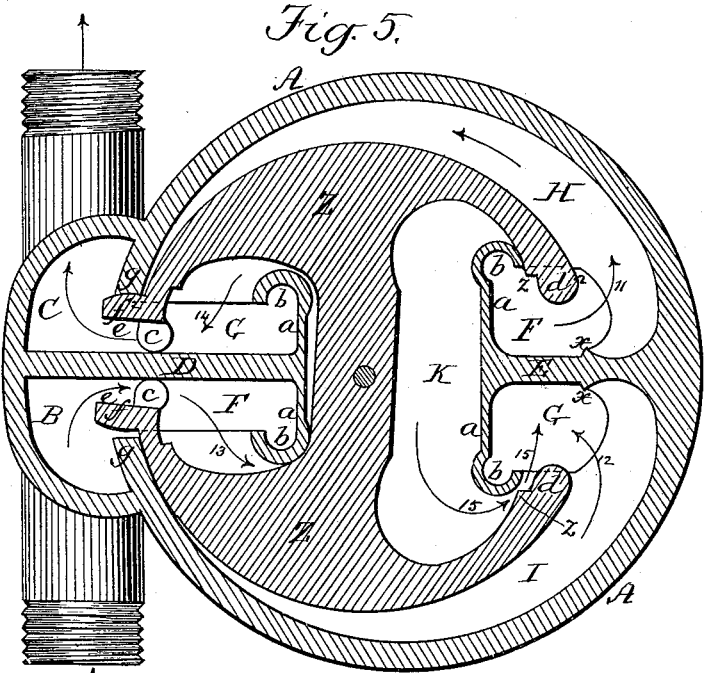

Figure 1 represents in vertical section my improved water-meter, taken on the line $x\ x$ of Fig. 2. Figs. 2, 3, 4, and 5 are horizontal sections of the same, taken on the line $y\ y$ of Fig. 1, showing the oscillating piston in different positions; Fig. 6, a vertical section taken on the line $z\ z$ of Fig. 2; Fig. 7, a horizontal section taken on the line $a\ a$ of Fig. 1, and Fig. 8 shows a modification of my improvement.

The meter-case A is preferably cylindrical, having a chamber for the oscillating piston Z and a chamber for the register connecting mechanism. The case-chamber has at one side an extension-chamber forming the inlet-passage B and the outlet-passage C, which extend under and over the measuring-chambers to connect with ports F and G, leading, respectively, into the measuring-chambers.

As seen in Fig. 6, the inlet-passage B connects under the measuring-chambers with the ports F, and as seen in Figs. 1 and 6, the outlet-passage C connects through the top chamber with the ports G. The case-chamber has radial abutments D and E, which, in connection with the oscillating piston, serve to divide the said chamber into separate measuring-chambers, and also to divide the interior of the piston into separate measuring-chambers. As shown, these abutments are formed by vertical walls extending from the inner walls of the case, to separate the inlet from the outlet ports F and G, and terminate in laterally-extending wings $a$, which terminate in bearing ends having ports $b$, through which the water flows out at the vertical sides of the measuring-chambers. A space is left in the center of the case-chamber, between these abutments, for the proper operation of the piston Z in its dividing function of said chamber. At the side extension-chamber the inlet and the outlet passages B and C have vertical wall ports $e$, which serve to increase the capacity for the inflow and for the outflow.

The form of the abutments which I have shown requires the form of the piston which I have also shown. In such form the piston has two chambers of such conformation that their walls must perpetually make a joint, forming contact with either one or the other of the bearing ends $b$ of the abutments, and thereby continually divide the said piston-chambers into receiving and discharging spaces. The piston-chambers for this purpose are made to receive the case abutments through openings in the side walls, which at $c$ form bearings upon the abutment-wall D, and thereby serve to guide the piston in its rocking dividing movements. The piston-chamber receiving the other abutment E has an opening of sufficient width to permit of its dividing rocking movements over the said abutment, while the piston ends at $d\ d^2$ form joint-forming bearings with the said abutment E and with the case-chamber walls during a portion of the movements of the piston. The outer walls of the piston, between its ends $c$ and $d$, also form contact with the interior walls of the case-chamber during a portion of the piston's movement, while horns or projections $f\ f^2$ stand out from the piston bearing ends $c$, to operate in connection with the walls $g$ of the ports $e$ to form a joint with the case-wall during a portion of the piston's movement. By the joint-forming action of these parts the case-chambers are divided into alternate enlarging and contracting spaces by the operation of the piston. The registration of the flow is effected by means of the disk-crank $h$, connected by the shaft $i$ with a pinion, $j$, which drives a gear, $k$, which is mounted upon a shaft, $l$, passing through a stuffing-box, $m$, and connects with the indicating mechanism.

I have shown and described a construction of two case abutments and a piston having two chambers coacting with said abutments; but I may change the construction so that the case may have three or more abutments and the piston corresponding chambers, and preserve the identical operation of an easy and quiet flow and the avoidance of all retarding or locking action upon the piston, as illustrated in Fig. 8.

I have stated that the case-ports must be of large capacity, and for this purpose it will be seen that they occupy the space inclosed by the abutments and their arms, and that they occupy opposite positions in the top and bottom of the measuring-chambers.

I will now describe the operation of my meter. The piston being in the position shown in Fig. 2, the flow passes from the inlet-passage through the ports F into the enlarging space J at arrow 2, and into the enlarging space H at arrows 3 at both abutments, and at the same time passing from the inlet into the enlarging space I, as shown by the arrow 4, filling these spaces, which constitute divisions of the measuring-chambers, driving the piston in the direction of the arrow 1. The space H, as shown, has nearly reached its full area, and the piston-arm $d^2$ is just on the point of closing its inlet-port F. When this full movement is reached, the piston arm $d^2$ closes all inlet into the chamber-space H, and instantly opens its exhaust-port, which is shown closed by the piston projection $f^2$ in said figure, but open in Fig. 3, in which the piston is shown as having moved to open such exhaust-port. Meanwhile, the chambers I and J continue to enlarge and the piston to move in the direction of the arrow 1, Fig. 3, forcing the water out of chamber H at $e$ into the exhaust-passage and from the piston-chamber K, (shown by the arrow 5,) said chamber being in this position of the piston divided by the bearing end $b$ of the abutment E, and beginning to enlarge, as at arrows 6. With this motion the piston is carried to the position shown in Fig. 4, wherein the chamber I has ceased to enlarge, the piston has just closed the inlet-port at $g$, and the arm $d$ of the piston is at the point of opening the exhaust-port at G. The space H is filling at arrow 7 and exhausting at arrow 8, while the space K is filling at arrow 9 and the space J is exhausting at arrow 10. With this motion the piston is brought into the position shown in Fig. 5, wherein the chamber H is filling, as at arrow 11, and the chamber I is discharging, as at arrow 12, while chamber J is filling at arrow 13 and exhausting at arrow 14. The piston-space K is now enlarged to its greatest capacity, and the piston is on the point of changing communication from the inlet to the outlet by making contact by its arm $d^2$ with the abutment-bearing $b$, and breaking contact instantly at its arm $d$, allowing the escape of the water from the said space K at arrow 15. This making and breaking contact at the points stated takes place while the piston has such a movement that the chamber K is neither increasing nor diminishing in capacity, and therefore there can be no crowding of the water in said chamber, and therefore there is no tendency to retard the movement of the piston at this point.

In a similar change of the piston, when the exterior measuring-chambers are at their greatest capacity, the piston operates to close the inlet-ports and to open the exhaust at the instant when the said chamber is neither increasing nor decreasing in volume, as illustrated in Fig. 4, and therefore there is no crowding of the water in said chamber and no tendency to retard the movement of the piston at this time. When an interior piston-chamber and an exterior case-chamber are both discharging, as shown at K and I in Fig. 2, the piston-arm will open free communication between these chambers, as at $d$ in Fig. 2. To render the joint-forming action of the piston-arms $d$ $d^2$ quick, the walls of the abutment E are formed with sharp projections $x$ $x$, so that the said piston-arms will open or break contact with the abutment-walls at the same instant the case-ports F are opened. The inner walls of the piston-arms $d$ $d^2$ are also formed with projections $z$ $z$, for the same purpose as the abutment projections $x$ $x$.

Referring to the abutment bearing-wall ports, it will be noticed that they extend from head to head of the case and open so as to form a free passage for the water in direct communication with the opposite inlet and outlet ports F and G, and thereby give the advantage of allowing the water to act promptly in entering the chamber.

If the piston-chambers were supplied from ports in the chamber-heads alone, the water must necessarily flow one-half the height of the piston from each end in a very short time if the piston is moving fast, in order to properly fill the receiving and the discharging chamber spaces; but by the provision of these ports along the abutment-bearing ends the flow is free and full, and all cause of suction and retarding of the piston is avoided.

As the movement of the piston, as stated, is that of a body revolving about the center of the case, having at the same time a motion of oscillation around its own axis, and is therefore exactly that of the eccentric-strap of a steam-engine, therefore in such movement the piston of the meter herein described is distinguished from the movements of the pistons described in my applications Serial Nos. 180,083 and 181,774 in this, that the said pistons revolve around the center of the case, but do not rotate on their axis.

I claim—

1. The combination, in a water-meter, of a case having two or more radial abutments separating the inlet and the discharge ports with a piston having a revolving oscillating movement, adapted to operate to divide the case-chamber into receiving and discharging spaces and having an interior chamber open at the side and for each abutment which divides it into receiving and discharging spaces, the walls of said chamber-openings having a form and relation to co-operate with case-wall bearings to make instant contact and separation, and thereby prevent the confining of the water within the measuring-chambers and the consequent locking or retarding of the piston, substantially as described.

2. The combination, in a water-meter, of a case having two or more radial abutments extending into the case-chamber, and having inlet and outlet ports at the top and bottom of said chamber, with a piston having a revolving oscillating movement and having an interior chamber open at the side for each abutment which divides it into receiving and discharging spaces, the said piston being adapted to divide the case-chamber into enlarging and diminishing receiving and discharging spaces.

3. The combination, in a water-meter, of a case having two or more radial abutments extending into the case-chamber and having joint-forming bearing ends $b$, formed with ports open at their ends and along their sides extending from head to head of the case, with a piston having a revolving oscillating movement and having an interior chamber open at the side for each abutment, and the case inlet and outlet ports F and G, whereby the several enlarging and diminishing spaces of the case-chamber and of the piston-chambers are freely supplied along the open sides of said abutment-ports, substantially as herein set forth.

4. In a water-meter having a piston having a revolving oscillating movement, the center whereof describes a curved orbit about the center of the case, the said case having two or more abutments formed with side surface-bearings, $x\ x$, and the said piston having two or more interior chambers formed with bearing-arms $d\ d'$, adapted to form joint contact with the abutment-bearing ends $b$ and with the said side surface-bearings, the said abutments from $b$ to $x$ being formed with recesses which constitute port-openings, whereby the said piston-arms are caused to break contact with said bearings $x\ x$ and open communication with the case-chambers when the latter are at their greatest capacity, and also to break contact with the abutment-bearing ends when the piston-chambers are at their greatest capacity.

5. In a water-meter, the case having the interior wall-bearings, $b$, $x\ x$, and $g\ g$, and the opposite inlet and discharge ports F and G, in combination with a piston having a revolving oscillating movement the center whereof describes a curved orbit about the center of the case, having interior chambers open at the side and terminating in bearings $d\ d'$ and $f\ f'$, substantially as described, and for the purpose specified.

In testimony whereof I have hereunto set my hand in the presence of two subscribing witnesses.

LEWIS HALLOCK NASH.

Witnesses:
A. E. H. JOHNSON,
J. W. HAMILTON JOHNSON.